United States Patent [19]
Zunkel

[11] 3,947,561
[45] Mar. 30, 1976

[54] METHOD OF REMOVING MERCURY FROM SULFURIC ACID

[75] Inventor: Alan Douglas Zunkel, Aliquippa, Pa.

[73] Assignee: St. Joe Minerals Corporation, New York, N.Y.

[22] Filed: June 14, 1974

[21] Appl. No.: 479,552

Related U.S. Application Data

[63] Continuation-in-part of Ser. No. 402,790, Oct. 2, 1973, abandoned.

[52] U.S. Cl. .................................. 423/531; 423/102
[51] Int. Cl.² ......................................... C01B 17/90
[58] Field of Search ............. 423/531, 101, 99, 102, 423/210; 210/50, 51, 59

[56] References Cited
UNITED STATES PATENTS

| | | | |
|---|---|---|---|
| 3,145,080 | 8/1964 | Jockers et al. | 423/531 |

FOREIGN PATENTS OR APPLICATIONS

| | | | |
|---|---|---|---|
| 577,324 | 6/1959 | Canada | 423/531 |
| 1,054,972 | 4/1959 | Germany | 423/531 |
| 2,029,117 | 6/1969 | Germany | 423/531 |
| 1,216,263 | 5/1966 | Germany | 423/531 |

*Primary Examiner*—Oscar R. Veritz
*Assistant Examiner*—Gary P. Straub
*Attorney, Agent, or Firm*—Dennis P. Clarke; Harold L. Stowell

[57] ABSTRACT

Mercury is removed from sulfuric acid by adding finely divided aluminum to the acid, cooling the mixture to a temperature not exceeding about 15°C. and filtering the mixture in from about 1 to about 6 hours.

1 Claim, No Drawings

METHOD OF REMOVING MERCURY FROM SULFURIC ACID

This is a continuation-in-part appplication of application Ser. No. 402,790 filed Oct. 2, 1973, now abandoned.

In the manufacture of sulfuric acid from sulfur dioxide bearing gases, the presence of mercury vapor in said gases may lead to unacceptably high mercury content in the finished acid. Although historically the presence of mercury in sulfuric acid has not been much of a problem, indications are that in the future the maximum allowable mercury concentrations in sulfuric acid may be specified at levels that are lower than are now common. Present methods for manufacture of sulfuric acid from metallurgical gas cannot cope adequately with the mercury vapor commonly carried over in the sulfur dioxide gas, from roasting sulfide ores, which is to be converted into sulfuric acid. Further, present methods for purifying sulfuric acid produced from mercury-laden $SO_2$ gases may not be able to remove the mercury from the sulfuric acid to the levels which will become common in the future.

An object of this invention is to provide means for removal of mercury from product sulfuric acid to levels lower than 1 ppm mercury.

Another object of this invention is to recover at least a portion of the mercury in a form amenable to further treatment for the production of metallic mercury.

In the manufacture of sulfuric acid from metallurgical gases, common practice is to roast -- that is, to oxidize -- sulfide bearing minerals such as iron pyrite, zinc sulfide, lead sulfide, copper sulfide, and the like, to produce an offgas containing 2-17% sulfur dioxide together with nitrogen, oxygen, water vapor, and minor gaseous constituents such as argon and carbon dioxide. The gases leaving the roaster are hot and burdened with metallurgical dusts and fumes.

A common first step in gas purification is to remove a major portion of the particulate matter by passing the gases through a hot electrostatic precipitator. The dedusted gases are then chilled and scrubbed by irrigation in a packed tower with water or sulfuric acid. The cooled dedusted gases then pass through an electrostatic mist precipitator which removes tiny droplets of sulfuric acid mist. The now clean gases are then treated with strong for example, 93% sulfuric acid to remove the water vapor therefrom.

The cleaned and dried gases are then passed through a series of heat exchangers to prepare the sulfur dioxide for conversion to sulfur trioxide by catalytic oxidation. The $SO_3$, after cooling in the heat exchangers, is absorbed by scrubbing with 98.5–99% sulfuric acid. This acid, after adjustment to standard commercial strength, constitutes the normal end product of the process.

If the amount of mercury vapor present in the roaster exit gases is great enough, some will condense when the gases are chilled and will be found in the mist precipitator and/or coke box drips as metallic mercury. Most metallurgical gases do not contain this much mercury and, in any event, the mercury vapor in the chilled gases up to the point of saturation continues on to the drying tower where it is absorbed by the sulfuric acid. Since the drying tower is in closed circuit with the absorbers (where the $SO_3$ is absorbed), a portion of the mercury will appear in the finished acid.

Historically, where control of maximum level of mercury in product acid has been necessary, such control has been accomplished by selecting roaster feed stocks that are not high in mercury. With the new, much lower maximum mercury level specifications now becoming prevalent for sulfuric acid, even relatively low mercury content feedstocks produce enough mercury to cause the mercury level in the product acid to exceed permissible levels.

It is known in the arts that mercury may be displaced from solution by treatment with certain metals — such as copper, aluminum, or zinc. It is also known to apply these metals in comminuted form so as to maximize the surface area per unit mass of reactive metal. While zinc and other metals electronegative to mercury do, in fact, precipitate much of the mercury from a solution containing mercury salt, some mercury still remains in solution.

For certain uses of sulfuric acid, decreasing the mercury content to less than 1 ppm is desirable. Prior art procedures involving precipitation by electronegative metals such as copper, aluminum, zinc, and the like do not achieve removal of mercury to this low level.

It has now been found that the memory content of concentrated sulfuric acid can be lowered to less than 1 ppm by carefully controlled use of aluminum dust in substantial excess of one atom of aluminum to each atom of mercury present in the acid under certain conditions of time and temperature as herein described.

It has also been found that removal of mercury by the described method is much less sensitive to the presence of organic matter in the acid, such as may occur in acid made from Herreshof roaster gases from the roasting of sulfide ore concentrates containing residual flotation reagents, than when zinc or iron powders are used.

Product sulfuric acid leaving the absorbing tower is contacted during agitation with the finely divided aluminum dust. The mixture of aluminum dust and sulfuric acid is then cooled to no higher than 15°C. but above the freezing point of the acid and allowed to react for a period of about 1 to 6 hours. In general, the mercury content is reduced below 1 ppm within three hours. The thus treated sulfuric acid is filtered to remove the particulate hydrargyriferous substances and excess aluminum dust and then pumped to storage for shipment to the customer. Control of the quantity of aluminum dust added and the temperature at which the reactions take place are critical to minimize the quantity of aluminum remaining in the sulfuric acid and to maximize the removal of mercury from the product sulfuric acid. The use of other metallic dusts such as zinc and iron is less efficacious for the removal of mercury from product sulfuric acid. Examples of the use of aluminum dust for removal of mercury from sulfuric acid and examples illustrating the less effective use of zinc dust and iron dust follow.

EXAMPLE 1

Organic-laden 93% sulfuric acid containing 27.7 ppm Hg at 30°C. is mixed with 1 gram/liter of 6–9 micron aluminum dust. Following addition of the aluminum dust, the mixture is agitated and then quenched to 15°C. after 15 minutes agitation. Samples withdrawn from the agitated reaction vessel and filtered at the listed times after aluminum dust addition yield these results:

| Time After Al Dust Addition (hours) | ppm Hg in Treated Acid |
|---|---|
| 1 | 2.7 |
| 3 | 0.88 |
| 6 | 0.40 |

EXAMPLE 2

Organic-free 93% sulfuric acid containing 7.0 ppm Hg at 30°C. is mixed with 0.5 gram/liter of 6–9 micron Al dust. Following addition of the dust, the mixture is agitated and then quenched to 15°C. after 15 minutes agitation. Samples withdrawn from the agitated reaction vessel and filtered at the listed times after aluminum dust addition yielded these results:

| Time After Al Dust Addition (hours) | ppm Hg in Treated Acid |
|---|---|
| 1 | 1.1 |
| 3 | 0.50 |
| 6 | 0.28 |

EXAMPLE 3

Organic-laden 93% sulfuric acid containing 16.6 ppm Hg and subjected to the same treatment as in Example 1 except that 1 gram/liter of −325 mesh zinc dust was used as a purifying agent yielded these results:

| Time After Zn Dust Addition (hours) | ppm Hg in Treated Acid |
|---|---|
| 1 | 11.8 |
| 3 | 13.1 |
| 6 | 12.9 |

EXAMPLE 4

Organic-laden 93% sulfuric acid containing 16.6 ppm Hg and subjected to the same treatment as in Example 1 except that 1 gram/liter −325 mesh iron dust was used as a purifying agent yielded these results:

| Time After Fe Dust Addition (hours) | ppm Hg in Treated Acid |
|---|---|
| 1 | 11.8 |
| 3 | 12.9 |
| 6 | 11.3 |

EXAMPLE 5

Organic-free 93% sulfuric acid containing 7.0 ppm Hg and subjected to the same treatment as Example 2 except that 0.5 gram/liter −325 mesh zinc dust was used as a purifying agent yielded these results:

| Time After Zn Dust Addition (hours) | ppm Hg in Treated Acid |
|---|---|
| 1 | 1.7 |
| 3 | 1.5 |
| 6 | 1.8 |

EXAMPLE 6

Organic-free 93% sulfuric acid containing 7.0 ppm Hg and subjected to the same treatment as Example 2 except that 0.5 gram/liter −325 mesh iron dust was used as a purifying agent yielded these results:

| Time After Fe Dust Addition (hours) | ppm Hg in Treated Acid |
|---|---|
| 1 | 1.6 |
| 3 | 1.4 |
| 6 | 1.5 |

I claim:
1. A method of removing mercury from concentrated sulfuric acid which comprises treating the sulfuric acid with finely divided aluminum in an amount substantially in excess of one atom of aluminum for each atom of mercury present in the sulfuric acid agitating the mixture, then, cooling the acid to a temperature not exceeding about 15°C but above the freezing point of the acid and filtering the acid in from about 1 to 6 hours after adding the aluminum.

* * * * *